April 30, 1968          P. RUBIN          3,380,427
DIRECT MOUNTING TIRE GAGE
Filed May 10, 1966
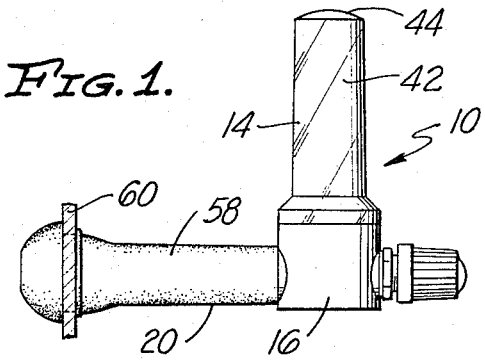
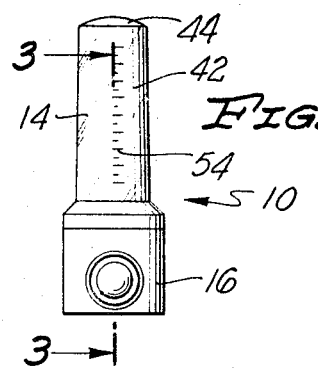
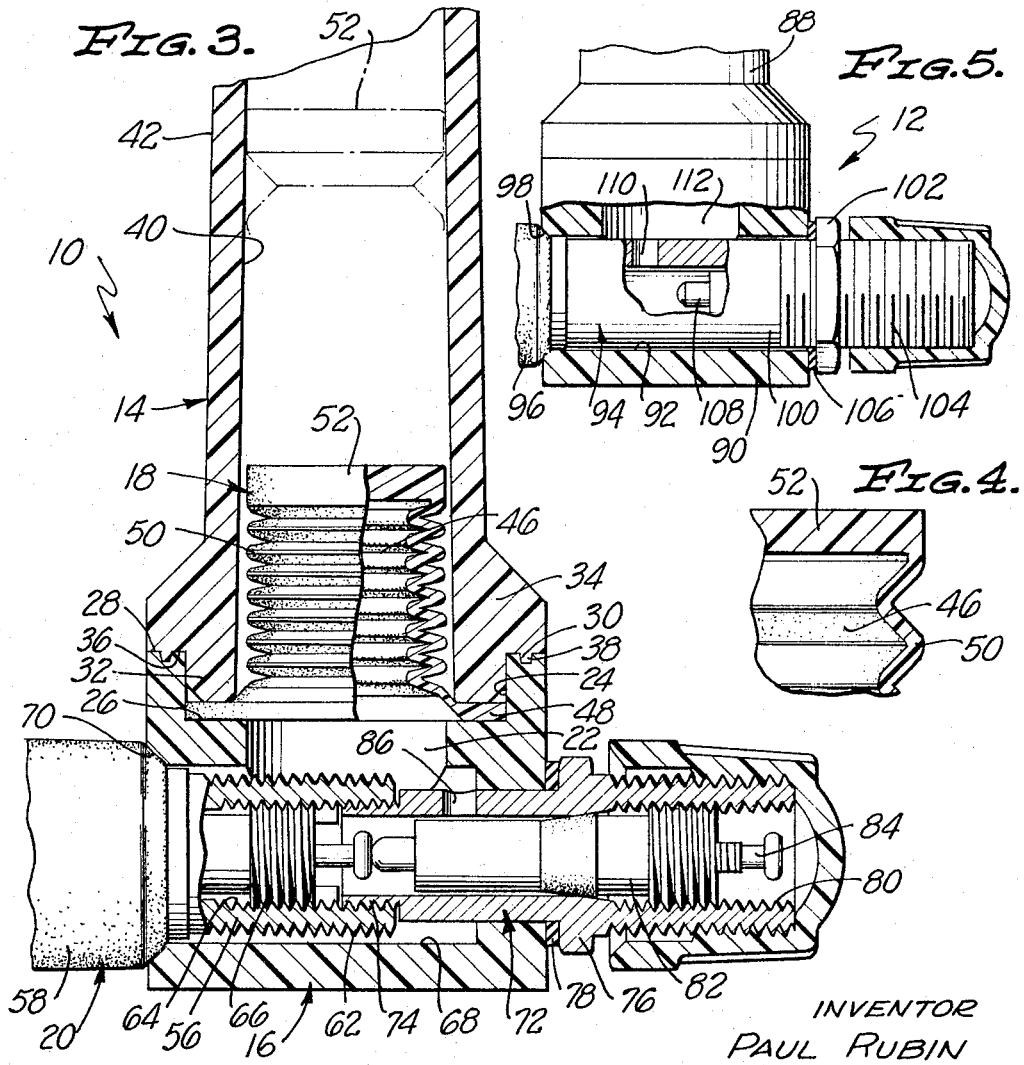
INVENTOR
PAUL RUBIN
BY
EDWARD D. O'BRIAN
ATTORNEY

United States Patent Office 3,380,427
Patented Apr. 30, 1968

3,380,427
DIRECT MOUNTING TIRE GAGE
Paul Rubin, 12582 Garnet St.,
Garden Grove, Calif. 92641
Continuation-in-part of application Ser. No. 434,178,
Feb. 18, 1965. This application May 10, 1966, Ser.
No. 549,012
3 Claims. (Cl. 116—34)

ABSTRACT OF THE DISCLOSURE

This invention is directed to a direct mounting tire gage. The tire gage comprises a bellows indicator and an indicator chamber in an indicator housing in which it moves. The indicator chamber is closed by the bellows indicator, so that the bellows indicator is positioned within the transparent indicator housing where pressure is substantially equalized across the bellows. The other side of the bellows, of course, is in communication with the interior of the vehicle tire for which it is indicating pressure. This communication is through the base of the indicator, to which bellows indicator and the indicator housing are secured. The base of the indicator has a bore therethrough. While there are two embodiments for mounting the direct mounting tire gage of this invention, in both cases the valve stem of the tire is positioned in the bore. In one case, an opening is provided in the side of the stem below the tire valve therein. This opening is in communication with the interior of the base and the interior of the bellows. In the other case, an adaptor is secured into the tire stem. This adaptor has a tire valve therein, and causes the normal tire valve to be opened. The space between these valves is in communication with the interior of the base and the interior of the bellows. In both cases, the opening through the base is sealed with respect to the tire valve structure so that leakage to the outside is prevented.

This application is a continuation-in-part of my application 434,178 filed Feb. 18, 1965, now abandoned.

Background

Previous tire inflation indicators, directly mounted upon the valve stem of the vehicle tire, are known. The prior devices have presented considerable difficulty as far as the maintenance of accuracy is concerned. The prior devices have been affected by temperature so that after use, particularly in high temperature environments, they have become inaccurate. Furthermore, prior devices have been made complex so as to overcome the temperature difficulties previously experienced. Furthermore, a number of the prior devices required the stretching of a rubber portion of the pressure indicator. This stretching caused air leakage through the rubber, with the consequent inaccuracy. The prior devices have been completely inadequate in meeting the low cost, high volume need for the safety feature of a direct and permanently mounted tire inflation indicator.

Description

It is an object of this invention to provide a direct mounting tire gage which can be inexpensively produced and easily mounted on a vehicle tire. Furthermore, it is an object of this invention to provide a tire gage which has a long, accurate life so that the tire inflation status can be readily noted. It is another object of this invention to provide a simple, easily manufactured direct mounting tire gage which may be manufactured and assembled with a minimum of expense so that such gages can be made economically available to aid in promoting automobile safety. It is still another object of this invention to provide a direct mounting tire gage which is capable of being used on existing valve stems and which is capable of being employed with special valve stems, especially created and installed therefor. Other objects and advantages of this invention will become apparent from a study of the following portion of this specification, the claims and the attached drawings.

FIG. 1 is a side elevational view of the direct mounting tire gage of this invention shown installed upon a tire valve stem, in accordance with the preferred embodiment of this invention.

FIG. 2 is a right end elevational view thereof.

FIG. 3 is an enlarged section, with parts broken away, taken generally along the line 3—3 of FIG. 2.

FIG. 4 is an enlarged sectional detail of the bellows indicator, shown in the pressure indicating position.

FIG. 5 is a partial sectional view through a further embodiment of the direct mounting tire gage of this invention.

Referring to the drawings, the preferred embodiment of the direct mounting tire gage of this invention is generally indicated at 10. The alternative embodiment is indicated at 12 in FIG. 5. Actually, the external appearance of the tire gage 12 is identical to the tire gage 10, and thus FIGS. 1 and 2 equally well illustrate the external appearance of the tire gage 12.

Tire gage 10 comprises an indicator housing 14, a base 16, indicator bellows 18 and a tire valve structure 20. Base 16 is generally cylindrical having an upright axis. It has an interior axial bore 22 which extends upwardly to form a chamber. Counter-bore 24 joins bore 22 at axial shoulder 26. Base 16 terminates in a circular upper edge 28 which contains groove 30. Base 16 is preferably made out of injection moldable polymer composition material so that it may be inexpensively produced to accurate sizes in large quantities.

Indicator housing 14 has boss 32 which enters into counter-bore 24 and is directed toward shoulder 26. Housing 14 has an external enlargement 34 which has the same outside diameter as the outside of base 16. Boss 32 joins the outside of enlargement 34 by means of face 36 which lies in engagement with edge 28. Futhermore, annular rib 38 engages in groove 30. The material of indicator housing 14 is polymer composition material and is of such nature as related to the material of base 16 so that the two can be secured together at edge 28, groove 30 and boss 32. Any convenient securement means can be used, such as adhesive means, but ultrasonic welding is considered to be the most desirable fastening means for high production strong joining and complete sealing. Furthermore, the material of indicator housing 14 is transparent so that the position of indicator bellows 18 can be seen therein, as is described more fully below.

Above enlargement 34, indicator housing 14 is generally tubular with an interior bore 40 and an exterior surface 42. As is seen in FIGS. 1 and 2, the top of the indicator housing is closed by top 44. Thus, the bore 40 is closed at its top.

Indicator bellows 18 is a critical part of tire gages 10 and 12. It must be accurately made and of the correct material so that the tire gages have a long, accurate life. Indicator bellows 12 has an open interior 46 which is directed toward bore 22. The bottom edge of the bellows has a flange 48 which is secured between the ends of boss 32 and shoulder 26. The securement is necessarily air tight, and adhesive sealing or ultrasonic sealing may be used. In fact, in the preferred structure ultrasonic sealing extends between boss 32, flange 48 and shoulder 26. The side walls of indicator bellows 18 are formed of circular accordion folded convolutions 50. There are sufficient convolutions 50 so as to provide great flexibility of the bellows 18 so that it can extend in bore 40. The external diameter of the convolutions are such that such extension is possible and some clearance is maintained. Furthermore, the wall thickness of convolutions 50 is sufficiently thin so as to permit this flexibility. A wall thickness of .020" is satisfactory for this purpose with the preferred material. However, the top 52 is sufficiently thick, about 1/16" with the preferred material, so that it remains relatively flat. The substantially closed position of the diaphragm is shown in FIG. 3 while the shape of the top and the walls in the extended position is shown in FIG. 4.

The preferred material of indicator bellows 16 is a synthetic polymer composition material falling within the class of thermoplastic, injection moldable elastomers. Rubber is considered unsatisfactory from a reliability standpoint, for it is temperature sensitive in the normal environment of the tire gages 10 and 12, and it is porous when stretched or flexed so that air in sufficient quantities can make the structure unreliable passes through such a structure when it is made of rubber. It is critical to use a material which is flexible, which is sufficiently limp so that it does not affect tire gage reading, which does not change reading characteristics due to moderately elevated temperatures, which remains flexible at low temperatures and which does not permit sufficient air to pass therethrough to affect the tire gage reading over a long life. An injection moldable thermoplastic polymer composition material meeting these requirements is desired, for high production is possible at low price. A proprietary compound that meets these conditions is manufactured by the Shell Chemical Company under the trade name "Thermoplastic." Their grade 202 is considered most desirable for this use.

It is clear that bore 22 is in communcation with the interior 46 of indicator bellows 18. Furthermore, it is clear that the upper interior defined by bore 40 and top 44 is closed from the exterior atmosphere. Thus, pressure in bore or chamber 22 is measured by the amount of extension of top 52 upwards in bore 40 which substantially equalizes the pressure between the inside and outside of indicator bellows 18. In view of the fact that convolutions 50 are highly flexible, the pressure difference is very slight. Thus, the position of top 52 within indicator housing 14 is a function of the pressure in bore 22. Preferably, the pressure can be directly read by suitable indicia 54 marked on housing 14. These indicia may be formed when the housing is injection molded, or may be later formed. Furthermore, they may be either interior or exterior of the housing.

Also significant in the design of tire gage 10, with respect to making it reliable, inexpensive and easy to apply, is the structure of base 16 and the manner in which the tire gage 10 is secured to tire valve structure 20. As is seen in the lower portion of FIG. 3 in the preferred embodiment of the tire gage 10, the tire valve structure 20 is conventional. It comprises a metallic tube 56 around which is molded rubber sleeve 58. Sleeve 58 may be integrally secured to an inner tube within a vehicle tire, or may be secured within a wheel 60, see FIG. 1, when the structure is used with a tubeless vehicle tire. Tube 56 is externally threaded at 62 to receive a conventional cap, and is internally threaded at 64 to receive a conventional tire valve 66. This much of the structure is conventional. Bore 68 extends transversely of the base 16 and intersects bore 22. Bore 68 has a chamfer at 70 so that sleeve 58 is sealingly engaged against base 16.

Retention member 72 engages in the interior thread 64 by means of threaded portion 74. Retention member 72 is generally tubular and has an external flange 76 with hexagonal surfaces so that retention member 72 can be screwed into the thread 64. Sealing washer 78 closes bore 68 with respect to the outside.

The interior bore of retention member 72 has threads 80 into which the standard tire valve 82 is inserted. Both the tire valves 56 and 82 are standard commercial types.

They each have a central plunger which carries the internal valving structure. The plunger of valve 82 is shown at 84. When these plungers are moved to the left as is shown in FIG. 3, the valves are opened. The distance between valve 66 and 82 is such that when valve 82 is positioned, its plunger depresses the plunger in valve 66 so that it is opened. Thus, the interior of the tire to which the valve structure 2 is secured is open to the interior bore of retention member 72. However, air is prevented from escaping to the outside because valve 82 is closed. Opening 86 provides communication from the interior of member 72 into bore 22 so that the interior of indicator bellows 18 has pressure corresponding to the interior of the tire. Thus, its position indicates the amount of this pressure.

The embodiment of tire gage 12, shown in FIG. 5, includes an indicator housing 88 and a base 90. This structure also includes an indicator bellows as previously described. Bore 92 through base 90 corresponds to bore 68 in tire gage 10. The difference in tire gage 12 is found in the fact that tire valve structure 94 is different than the standard tire valve structure 20. The tire valve structure 94 is arranged with a rubber sleeve 96 bonded thereto, similarly to sleeve 58 so that the sleeve 96 can seal with respect to chamfer 98. However, the tubular metallic portion 100 of tire valve structure 94 is sufficiently long so that nut 102 can be threaded on the external threads 104. Sealing washer 106, positioned under nut 102, seals against the other end of the base so that the tire valve structure is sealed with respect to the base. Interiorly, tire valve structure 94 has a standard tire valve 108 which closes the right end of tube 100 to the atmosphere. It is through this valve that air is admitted to the tire. Opening 110 in the side of the tube 100 is in communication with chamber 112, which corresponds to bore or chamber 22. Thus, the tire gage 12 is a simpler structure than tire gage 10, but requires a special tire valve structure 94. Thus, both tire gages are desirable structures which are semi-permanently affixed to the tire valve structure and accurately read the tire pressure. This is a safety feature, for at regular occasions when he stops the car, the driver can readily inspect the tire pressure.

This invention having been described in its preferred embodiment, it is clear that it is susceptible to numerous modifications and changes within the ability of those skilled in the art and without the exercise of the inventive faculty. Accordingly, the scope of this invention is defined by the scope of the following claims.

I claim:

1. A tire gage to be used with a tire valve structure having a sleeve and a threaded tube extending from said sleeve, said tire gage comprising:

a base having an interior bore extending therethrough, said bore being adapted to fit around said threaded tube so that said base fits against said sleeve, a retention member engaging said base, said retention member being adapted to be threaded to said threaded tube so that said base is held between said retention member and said sleeve so that said base is sealed with respect to said retention member and said sleeve, valve means for controlling the inflation of a tire associated with said tire valve structure located so as to be connected to said threaded tube, said base having a chamber therein in communication with said bore, means for allowing air to pass from the interior of said tire valve structure into said bore and said chamber an imporous bellows having highly flexible convolutions and a top, said bellows being located on said base so that the interior of said bellows is open to said chamber, an indicator housing located in contact with said bellows and said base and surrounding said convolutions and said top of said bellows so that said convolutions can expand into the interior of said housing, moving said top of said bellows within said indicator housing, said bellows being located in sealed relationship with said base, and said indicator housing being located in sealed relationship to said bellows and said base so that a fixed quantity of gas is located within said indicator housing in contact with said bellows so that the position of the top of said bellows within said indicator housing is determined by the pressure of gas within said housing and the pressure of air within said chamber, said indicator housing being transparent so that the top of said bellows is visible to indicate the inflation of a tire associated with said tire valve structure.

2. A tire gage as claimed in claim 1 wherein:

said valve means is a valve located on said retention member, said valve on said retention member being adapted to engage another valve located on said threaded tube so as to hold said other valve open.

3. A tire gage as claimed in claim 1 wherein said valve means is a valve located upon said threaded tube.

References Cited

UNITED STATES PATENTS

| | | | |
|---|---|---|---|
| 1,422,256 | 7/1922 | Conrad | 73—14 |
| 1,548,470 | 8/1925 | Kennedy | 116—34 |
| 2,190,530 | 2/1940 | Clarkson | 73—14 |
| 2,417,449 | 3/1947 | Rubin | 116—34 |
| 2,618,977 | 11/1952 | Hottenroth | 116—34 |
| 2,689,481 | 9/1954 | Quiat | 116—34 |
| 2,738,752 | 3/1956 | Dascombe | 116—34 |
| 2,896,566 | 7/1959 | Laurie, et al. | 116—34 |
| 2,934,036 | 4/1960 | Anderson et al. | 116—125 |
| 2,967,509 | 1/1961 | Florian | 116—34 |

LOUIS J. CAPOZI, *Primary Examiner.*